(12) United States Patent
Chiou et al.

(10) Patent No.: US 7,161,309 B2
(45) Date of Patent: Jan. 9, 2007

(54) PROTECTING A COLD CATHODE FLUORESCENT LAMP FROM A LARGE TRANSIENT CURRENT WHEN VOLTAGE SUPPLY TRANSITIONS FROM A LOW TO A HIGH VOLTAGE

(75) Inventors: Chii-Fa Chiou, Lake Forest, CA (US); Yuji Yoshida, Irvine, CA (US)

(73) Assignee: Microsemi Corporation, Irvine, CA (US)

( * ) Notice: Subject to any disclaimer, the term of this patent is extended or adjusted under 35 U.S.C. 154(b) by 309 days.

(21) Appl. No.: 10/933,668

(22) Filed: Sep. 3, 2004

(65) Prior Publication Data

US 2006/0049778 A1    Mar. 9, 2006

(51) Int. Cl.
*H05B 37/02* (2006.01)

(52) U.S. Cl. ............... 315/291; 315/307; 315/224; 315/209 R; 315/276; 315/DIG. 7

(58) Field of Classification Search ............ 315/291, 315/307, 224, 209 R, 276, 200 R, 227 R, 315/219, 297, 272–274, DIG. 7
See application file for complete search history.

(56) References Cited

U.S. PATENT DOCUMENTS

| | | | |
|---|---|---|---|
| 5,225,741 A | 7/1993 | Auld, Jr. et al. | 315/307 |
| 5,449,981 A | 9/1995 | Auld, Jr. et al. | 315/308 |
| 5,923,129 A | 7/1999 | Henry | 315/307 |
| 5,930,121 A | 7/1999 | Henry | 363/16 |
| 6,198,236 B1 * | 3/2001 | O'Neill | 315/307 |
| 6,307,765 B1 | 10/2001 | Choi | 363/134 |
| 6,469,922 B1 | 10/2002 | Choi | 363/134 |
| 6,654,268 B1 | 11/2003 | Choi | 363/134 |
| 6,670,781 B1 * | 12/2003 | Weindorf | 315/307 |
| 6,853,153 B1 * | 2/2005 | Gray | 315/291 |
| 2005/0174818 A1 * | 8/2005 | Lin et al. | 363/98 |

* cited by examiner

*Primary Examiner*—Haissa Philogene
(74) *Attorney, Agent, or Firm*—Robert A. Voight, Jr.; Winstead Sechrest & Minick P.C.

(57) ABSTRACT

A compensation circuit for protecting a lamp from a large transient current. The compensation circuit may include a saw tooth generator configured to generate a saw tooth signal with an amplitude corresponding to a supply voltage of the lamp. A pulse width modulated signal may be generated by a comparator of the compensation circuit based on the saw tooth signal and a DC signal. The duty cycle of the pulse width modulated signal may be used by a controller to control the duration of time that current flows through the lamp. When the supply voltage of the lamp transitions from a low voltage to a high voltage, the amplitude of the saw tooth signal increases. When the amplitude of the saw tooth signal increases, the duty cycle of the pulse width modulated signal decreases thereby causing the controller to decrease the duration of time that current flows through the lamp.

14 Claims, 7 Drawing Sheets

PROTECTING A COLD CATHODE FLUORESCENT LAMP FROM A LARGE TRANSIENT CURRENT WHEN VOLTAGE SUPPLY TRANSITIONS FROM A LOW TO A HIGH VOLTAGE

TECHNICAL FIELD

The present invention relates to the field of fluorescent lamps, and more particularly to protecting a cold cathode fluorescent lamp from a large transient current when the voltage supply transitions from a low voltage, e.g., 6 volts, to a high voltage, e.g., 22 volts.

BACKGROUND INFORMATION

Fluorescent lamps are used in a number of applications where light is required but the power required to generate light is limited. One particular type of fluorescent lamp is a Cold Cathode Fluorescent Lamp (CCFL). CCFLs may be used for back or edge lighting of Liquid Crystal Displays (LCDs) which are typically used in laptop computers, web browsers, automotive and industrial instrumentation, and entertainment systems.

CCFL tubes typically contain a gas, such as Argon, Xenon, or the like, along with a small amount of Mercury. After an initial ignition stage and the formation of plasma, current flows through the tube which results in the generation of ultraviolet light. The ultraviolet light in turn strikes a phosphoric material coated in the inner wall of the tube, resulting in visible light.

A power conversion circuit may be used for driving the CCFL. The power conversion circuit accepts a Direct Current (DC) supply voltage and provides a substantially sinusoidal output voltage to the CCFL. The brightness of the CCFL is controlled by controlling the current, i.e., the lamp current, through the CCFL. The lamp current may be amplitude modulated or time modulated for controlling the brightness of the CCFL. The lamp current may be time modulated by selectively turning off the sinusoidal output voltage provided to the CCFL for varying time durations. For example, the sinusoidal output voltage alternates between being on for $T_{ON}$ seconds and being off for $T_{OFF}$ seconds. The period, i.e., the summation of $T_{ON}$ and $T_{OFF}$, may be generally fixed in constant frequency operation to reduce Electro-Magnetic-Field (EMF) interference with other devices. The on-time duty cycle (referring to the proportion of time that the sinusoidal output voltage is on as indicated in the equation $T_{ON}/(T_{ON}+T_{OFF})$) determines the brightness of the CCFL. Maximum brightness results when the sinusoidal output voltage is on all the time with a 100% duty cycle, i.e., $T_{OFF}=0$. Minimum brightness results when the duty cycle is small, i.e., $T_{OFF}>>T_{ON}$.

When the supply voltage (DC supply voltage) referred to above changes from a low voltage, e.g., 6 volts, to a high voltage, e.g., 22 volts, there may result a large transient current inputted to the CCFL. This large transient current may result in shortening the lifetime of the CCFL. For example, in certain applications such as a laptop computer, a user may use either a battery or an adapter, e.g., Alternating Current (AC) adapter, which may supply a different amount of voltage. For example, the battery may supply 6 volts; whereas, the adapter may supply 22 volts. If a user switches from using a low supply voltage, e.g., battery, to a high supply voltage, e.g., adapter, then a corresponding increased sinusoidal output voltage may be produced. This increased sinusoidal output voltage may produce a large transient current which is inputted to the CCFL thereby shortening the lifetime of the CCFL.

If, however, the CCFL could be protected from such a large transient current, then the lifetime of the CCFL may be prolonged.

Therefore, there is a need in the art to protect a cold cathode fluorescent lamp from a large transient current when the voltage supply transitions from a low voltage, e.g., 6 volts, to a high voltage, e.g., 22 volts.

SUMMARY

The problems outlined above may at least in part be solved in some embodiments by having a saw tooth generator configured to generate a saw tooth signal with an amplitude corresponding to the supply voltage of the Cold Cathode Fluorescent Lamp (CCFL). When the supply voltage of the CCFL transitions from a low voltage, e.g., 6 volts, to a high voltage, e.g., 22 volts, the amplitude of the saw tooth signal correspondingly increases. A pulse width modulated signal may be generated by a comparator based on the saw tooth signal described above and a Direct Current (DC) signal. The duty cycle of the pulse width modulated signal may be used by a controller circuit to control the duration that current flows through the CCFL. When the amplitude of the saw tooth signal increases, such as when the supply voltage of the CCFL transitions from a low voltage to a high voltage, the duty cycle decreases and hence the duration of time that current flows through the CCFL is decreased. By decreasing the duration of time that current flows through the CCFL when the supply voltage of the CCFL transitions from a low voltage to a high voltage, the CCFL may be protected from receiving a large transient current for a significant period of time that may lessen the lifetime of the CCFL. Hence, by using the above outlined process, the lifetime of the CCFL may be prolonged.

In one embodiment of the present invention, a compensation circuit to protect a lamp from a large transient current may comprise a saw tooth generator configured to generate a saw tooth signal with an amplitude corresponding to a supply voltage of the lamp. The compensation circuit may further comprise an amplifier configured to generate a Direct Current (DC) baseline signal. The compensation circuit may further comprise a comparator coupled to the saw tooth generator and the amplifier where the comparator outputs a pulse width modulated signal based on the saw tooth signal and the DC baseline signal. A duty cycle of the pulse width modulated signal is a function of the amplitude of the saw tooth signal.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a circuit and a compensation circuit for protecting a lamp from a large transient current. In one embodiment of the present invention, a compensation circuit may comprise a saw tooth generator configured to generate a saw tooth signal with an amplitude corresponding to a supply voltage of the lamp. The compensation circuit may further comprise an amplifier configured to generate a Direct Current (DC) baseline signal. The compensation circuit may further comprise a comparator coupled to the saw tooth generator and the amplifier where the comparator outputs a pulse width modulated signal based on the saw tooth signal and the DC baseline signal. A duty cycle of the pulse width modulated signal is a function of the amplitude of the saw tooth signal. When the supply voltage of the lamp transitions from a low voltage to a high voltage, the amplitude of the saw tooth signal correspondingly increases. When the amplitude of the saw tooth signal increases, the duty cycle of the pulse width modulated signal decreases thereby causing the duration of time that the lamp is activated to be a shorter percentage of time. By causing the duration of time that the lamp is activated to be a shorter percentage of time when the supply voltage of the lamp transitions from a low voltage to a high voltage, the lamp is protected from receiving a large transient current for a significant period of time that may lessen the lifetime of the lamp. Hence, by using the above outlined process, the lifetime of the lamp may be prolonged.

Although the present invention is described with reference to a Cold Cathode Fluorescent Lamp (CCFL), it is noted that the principles of the present invention may be applied to protecting the lifetime of any type of lamp. It is further noted that embodiments applying the principles of the present invention to protecting such lamps would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
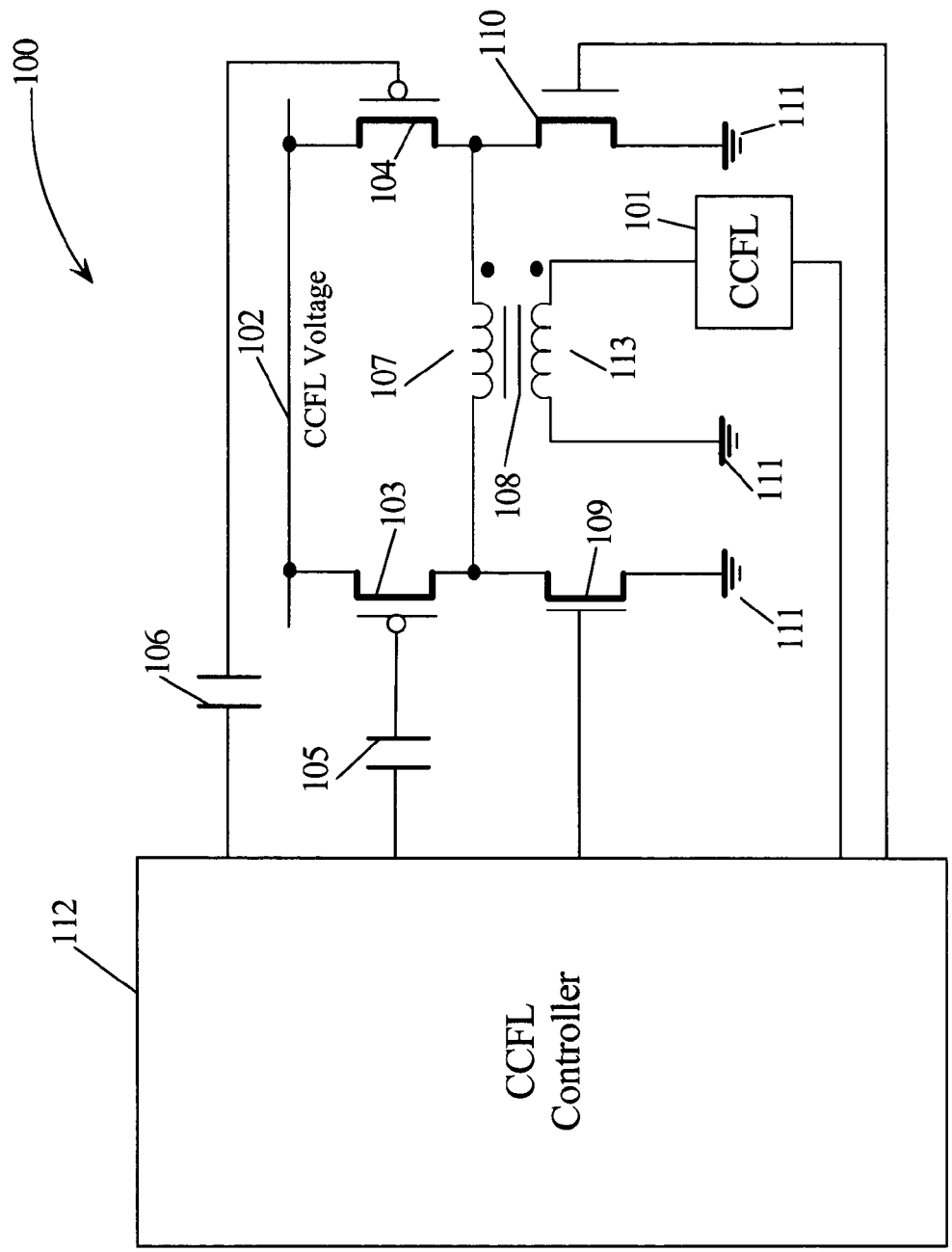
FIG. 1 illustrates an embodiment of the present invention of a drive circuit configured to drive a Cold Cathode Fluorescent Lamp (CCFL)

FIG. 1—Drive Circuit

FIG. 1 illustrates an embodiment of the present invention of a drive circuit 100. Drive circuit 100 may be configured to drive a Cold Cathode Fluorescent Lamp (CCFL) 101 using a Direct Current (DC) input supply voltage, CCFL voltage 102. The supply voltage from CCFL voltage 102 may be coupled to the sources of p-type transistors 103, 104. The gates of p-type transistors 103, 104 may be coupled to capacitors 105, 106, respectively. The drains of p-type transistors 103, 104 may be coupled to primary winding 107 of a transformer 108. The drains of p-type transistors 103, 104 may further be coupled to the drains of n-type transistors 109, 110, respectively. The sources of n-type transistors 109, 110 may be coupled to ground 111. The gates of n-type transistors 109, 110 and a terminal of capacitors 105, 106 may be coupled to a controller 112. The terminals of secondary winding 113 of transformer 108 may be coupled to ground 111 and to CCFL 101. CCFL 101 may further be coupled to controller 112. It is noted that FIG. 1 is illustrative and that drive circuit 100 may include other logic circuitry that were not depicted for ease of understanding. It is further noted that drive circuit 100 may include different logic circuitry to perform the functions as detailed below and that FIG. 1 is not to be limited in scope to the logic circuitry depicted.

Referring to FIG. 1, controller 112 may be configured to provide switching signals to the gate terminals of transistors 109, 110 and to capacitors 105, 106 which are coupled to the gate terminals of transistors 103, 104, respectively. The switching of transistors 103, 104, 109, 110 may be timed so that current will flow in one of two directions across primary winding 107 of transformer 108. Current will then flow in the opposite direction across secondary winding 113 of transformer 108. For example, if controller 112 activates transistors 103, 110 and deactivates transistors 104, 109, then current will flow from the positive to the negative terminal of primary winding 107 and current will flow from the negative to the positive terminal of secondary winding 113 and then to ground 111. Conversely, if controller 112 activates transistors 104, 109 and deactivates transistors 103, 110, then current will flow from the negative to the positive terminal of primary winding 107 and current will flow from the positive to the negative terminal of secondary winding 113 and then to CCFL 101. Hence, controller 112 controls the amount of time that current flows through CCFL 101.

Controller 112 may be further configured to control transistors 103, 104 such that a square wave voltage signal results across primary winding 107 of transformer 108. The inductance of transformer 108 is sufficiently high such that the voltage across secondary winding 113 of transformer 108 is sinusoidal. Thus, the voltage provided to CCFL 101 is sinusoidal, and the corresponding sinusoidal current passes through CCFL 101 to illuminate CCFL 101.

As stated in the Background Information section, when the supply voltage, e.g., CCFL voltage 102, changes from a low voltage, e.g., 6 volts, to a high voltage, e.g., 22 volts, there may result a large transient current inputted to the CCFL, e.g., CCFL 101. This large transient current may result in shortening the lifetime of the CCFL. For example, in certain applications such as a laptop computer, a user may use either a battery or an adapter, e.g., Alternating Current (AC) adapter, which may supply a different amount of voltage. For example, the battery may supply 6 volts;

whereas, the adapter may supply 22 volts. If a user switches from using a low supply voltage, e.g., battery, to a high supply voltage, e.g., adapter, then a corresponding increased sinusoidal output voltage (such as the sinusoidal output voltage produced across secondary winding 113 of transformer 108) may be produced. This increased sinusoidal output voltage may produce a large transient current which is inputted to the CCFL, e.g., CCFL 101, thereby shortening the lifetime of the CCFL. If, however, the CCFL could be protected from such a large transient current, then the lifetime of the CCFL may be prolonged. Therefore, there is a need in the art to protect a cold cathode fluorescent lamp from a large transient current when the voltage supply transitions from a low voltage, e.g., 6 volts, to a high voltage, e.g., 22 volts.

CCFL 101 may be protected from a large transient current when the voltage supply (CCFL voltage 102) transitions from a low voltage, e.g., 6 volts, to a high voltage, e.g., 22 volts, by generating a saw tooth signal whose amplitude corresponds to the voltage level of the CCFL voltage 102 as described further below. The saw tooth signal may be generated in a circuit, referred to herein as a "compensation circuit", as described below in association with FIG. 2.

Figure 2:
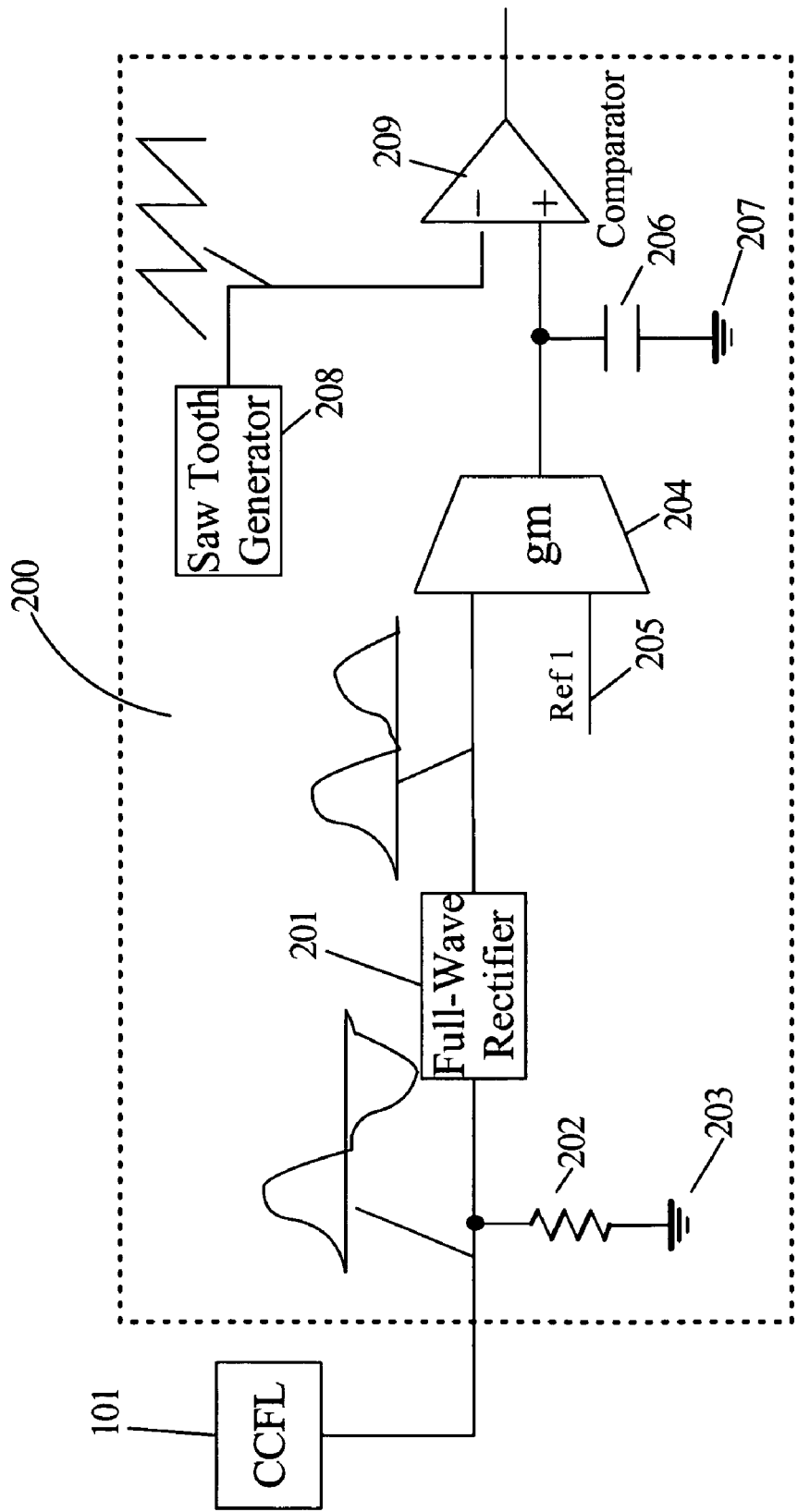
FIG. 2 illustrates an embodiment of the present invention of a compensation circuit configured to protect the CCFL from large transient currents.

FIG. 2—Compensation Circuit

FIG. 2 illustrates an embodiment of the present invention of a compensation circuit 200 coupled to CCFL 101 used to protect CCFL 101 from large transient currents when CCFL voltage 102 (FIG. 1) transitions from a low voltage to a high voltage as described further below.

Referring to FIG. 2, CCFL 101 may produce a sinusoidal output which may be coupled to a full-wave rectifier 201 configured to convert CCFL's 101 output signal into a direct current type signal. CCFL's 101 output signal may also be coupled to a resistor 202 coupled to ground 203. Resistor 202 may be used to determine the current flowing through CCFL 101.

The output of full-wave rectifier 201 may be coupled to an input of a transconductance amplifier 204. A reference voltage 205 (which may be user selected) generated by a voltage generator (not shown) may be inputted to the other input terminal of amplifier 204. Amplifier 204 may be configured to generate a current that is a function of the difference in voltages between reference voltage 205 and the output voltage of rectifier 201. The output of amplifier 204 is coupled to a terminal of capacitor 206. The other terminal of capacitor 206 is coupled to ground 207. The voltage across capacitor 206 may be referred to herein as the "Direct Current (DC) baseline signal" which is used in generating a pulse width modulated signal as described further below. This pulse width modulated signal may be used by controller 112 (FIG. 1) to control the switching of transistors 103, 104, 109 and 110 (FIG. 1) thereby controlling the time duration of current flowing through CCFL 101 as explained further below.

Compensation circuit 200 may further include a saw tooth generator 208 configured to generate a saw tooth signal whose amplitude corresponds to the voltage of CCFL voltage 102 as described in greater detail below in association with FIGS. 3–5. The saw tooth signal generated by saw tooth generator 208 is inputted to a comparator 209. Comparator 209 may further receive the DC baseline signal. Comparator 209 may be configured to compare the voltage level of the saw tooth signal generated by saw tooth generator 208 with the voltage level of the DC baseline signal to generate a signal, referred to herein as a "Pulse Width Modulated (PWM) signal."

As stated above, the PWM signal may be used by controller 112 to control the switching of transistors 103, 104, 109 and 110 thereby controlling the time duration of current flowing through CCFL 101. For example, referring to FIG. 1, when the PWM signal is high, controller 112 may be configured to activate transistors 104, 109 and deactivate transistors 103, 110 thereby allowing current to flow through CCFL 101. Conversely, when the PWM signal is low, controller 112 may be configured to activate transistors 103, 110 and deactivate transistors 104, 109 thereby not allowing current to flow through CCFL 101 but instead to flow to ground 111.

An illustration of a PWM signal being generated by comparator 209 with no compensation (prior art) and with compensation is described below in association with FIG. 3.

FIG. 3—PWM Signal

Figure 3:
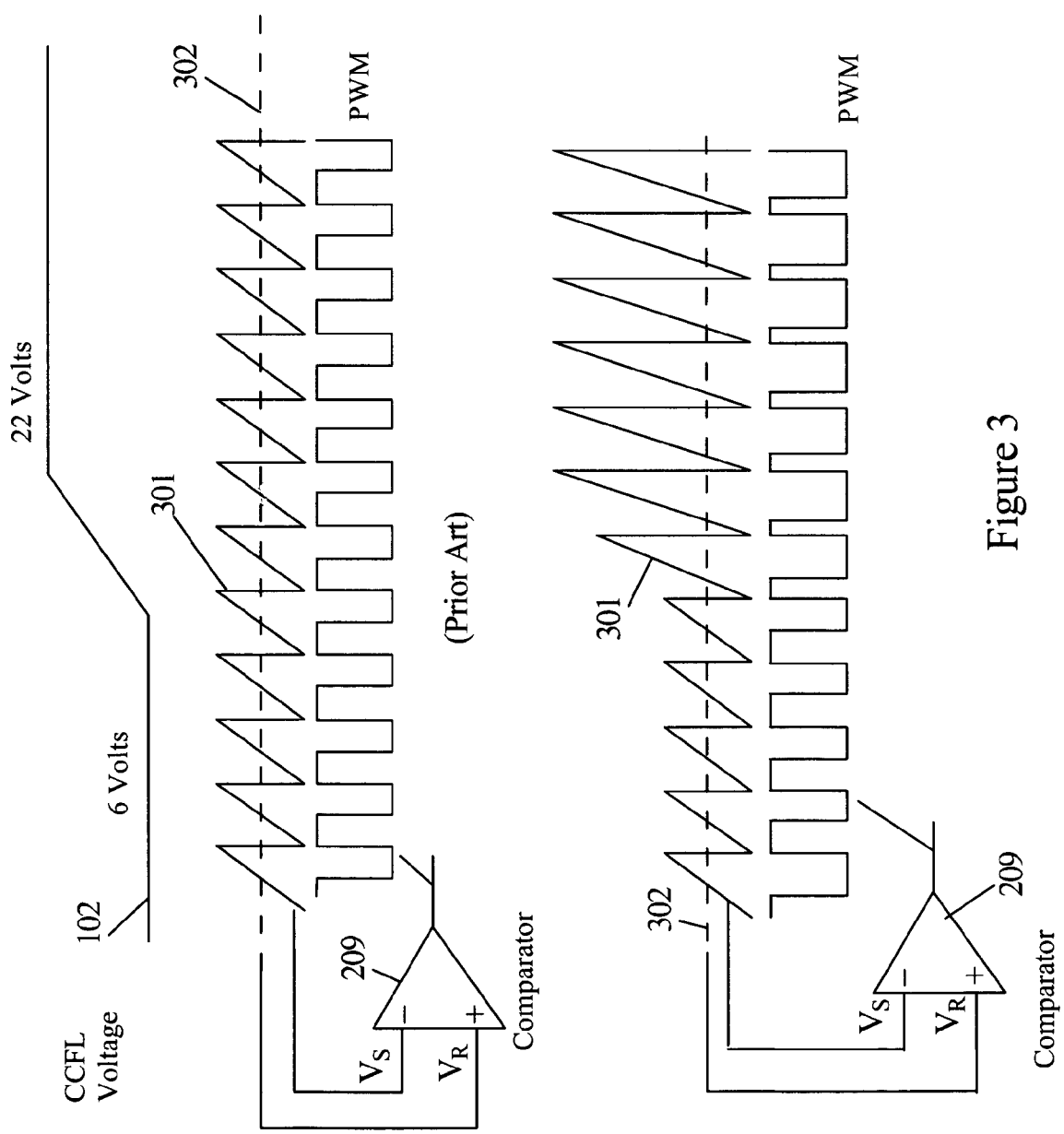
FIG. 3 illustrates pulse width modulated signals generated by a comparator of the compensation circuit when the supply voltage of the CCFL transitions from a low voltage to a high voltage for the case when compensation has not been added and for the case when compensation has been added in accordance with an embodiment of the present invention.

FIG. 3 is an illustration of PWM signals being generated by comparator 209 with no compensation (prior art) and with compensation when CCFL voltage 102 (FIG. 1) changes from 6 volts to 22 volts.

Referring to FIG. 3, in conjunction with FIG. 2, saw tooth signal 301 generated by saw tooth generator 208 with no compensation (illustrated in the top portion of FIG. 3) maintains a constant amplitude regardless of the voltage level of CCFL voltage 102. As stated above, DC baseline signal 302 corresponds to the voltage across capacitor 206. When the voltage level of CCFL voltage 102 is changed, e.g., the voltage level of CCFL voltage 102 switches from a low voltage to a high voltage, DC baseline signal 302 may remain relatively constant, as depicted in FIG. 3, depending on the size of the capacitance of capacitor 206 as well as the frequency of saw tooth signal 301. It is noted that FIG. 3 is illustrative and that the voltage level of DC baseline signal 302 may slightly fluctuate when the voltage level of CCFL voltage 102 changes. For example, when there is no compensation (illustrated in the top portion of FIG. 3), the voltage level of DC baseline signal 302 may be slightly lower after the voltage level of CCFL voltage 102 switches from a low voltage to a high voltage. When there is compensation (illustrated in the bottom portion of FIG. 3), the voltage level of DC baseline signal 302 may be slightly higher after the voltage level of CCFL voltage 102 switches from a low voltage to a high voltage.

Referring to the top portion of FIG. 3, since the DC baseline signal 302, which corresponds to the voltage across capacitor 206, may remain relatively constant, comparator 209 may produce a PWM signal with a relatively constant duty cycle. A duty cycle may refer to the proportion of time that the PWM signal is activated (high). For example, the duty cycle may be defined as $(T_{HIGH}/(T_{HIGH}+T_{LOW}))$ where $T_{HIGH}$ indicates the time that the PWM signal is a high value, e.g., binary value of 1, and where $T_{LOW}$ indicates the time that the PWM signal is a low value, e.g., 0. Comparator 209 may be configured to generate a high value when saw tooth signal 301 is below DC baseline signal 302 and, conversely, may be configured to generate a low value when saw tooth signal 301 is above DC baseline signal 302. As stated above, when the PWM signal is high, controller 112 (FIG. 1) may be configured to activate transistors 104, 109 (FIG. 1) and deactivate transistors 103, 110 (FIG. 1) thereby allowing current to flow through CCFL 101. Conversely, when the PWM signal is low, controller 112 may be configured to activate transistors 103, 110 and deactivate transistors 104, 109 thereby not allowing current to flow through CCFL 101 but instead to flow to ground 111. Hence, when there is no compensation, the duty cycle may remain substantially the same when CCFL voltage 102 changes from a low voltage to a high voltage thereby causing an increased amount of current to flow through CCFL 101 for the same duration of time as when the voltage level of CCFL voltage 102 was low. Consequently, the lifetime of CCFL 101 may be shortened due to this increase of current flowing through CCFL 101 for the same duration of time as when the voltage level of CCFL voltage 102 was low.

CCFL 101 may be protected, at least in part, by compensating the duty cycle of the PWM signal when CCFL voltage 102 switches from a low voltage to a high voltage as illustrated in the bottom portion of FIG. 3. As illustrated in the bottom portion of FIG. 3, the amplitude of saw tooth signal 301 corresponds to the voltage level of CCFL voltage 102. When the voltage level of CCFL voltage 102 switches from a low voltage to a high voltage, the amplitude of saw tooth signal 301 increases. A further description of saw tooth generator 208 generating a saw tooth signal 301 with an amplitude that corresponds to the voltage level of CCFL voltage 102 is described further below in association with FIGS. 4–6. Since the voltage level of the DC baseline signal may remain relatively constant, the duty cycle of the resulting PWM signal produced by comparator 209 is decreased. The duty cycle of the resulting PWM signal produced by comparator 209 is decreased after the voltage level of CCFL voltage 102 is increased since a greater portion of the saw tooth signal 301 is above the DC baseline signal 302 after the voltage level of CCFL voltage 102 is increased.

By decreasing the duty cycle of the resulting PWM signal produced by comparator 209 after the voltage level of CCFL voltage 102 is increased, controller 112 may activate transistors 104, 109 and deactivate transistors 103, 110 for a shorter period of time thereby allowing the increased current (resulting from CCFL voltage 102 switching to a higher voltage level) to flow through CCFL 101 for a shorter period of time. By allowing the increased current to flow through CCFL 101 for a shorter period of time, the lifetime of CCFL 101 may be prolonged.

A more detail description of an embodiment of saw tooth generator 208 generating a saw tooth signal 301 whose amplitude is a function of the voltage of CCFL voltage 102 is described below in association with FIGS. 4A–B.

Figure 4A:
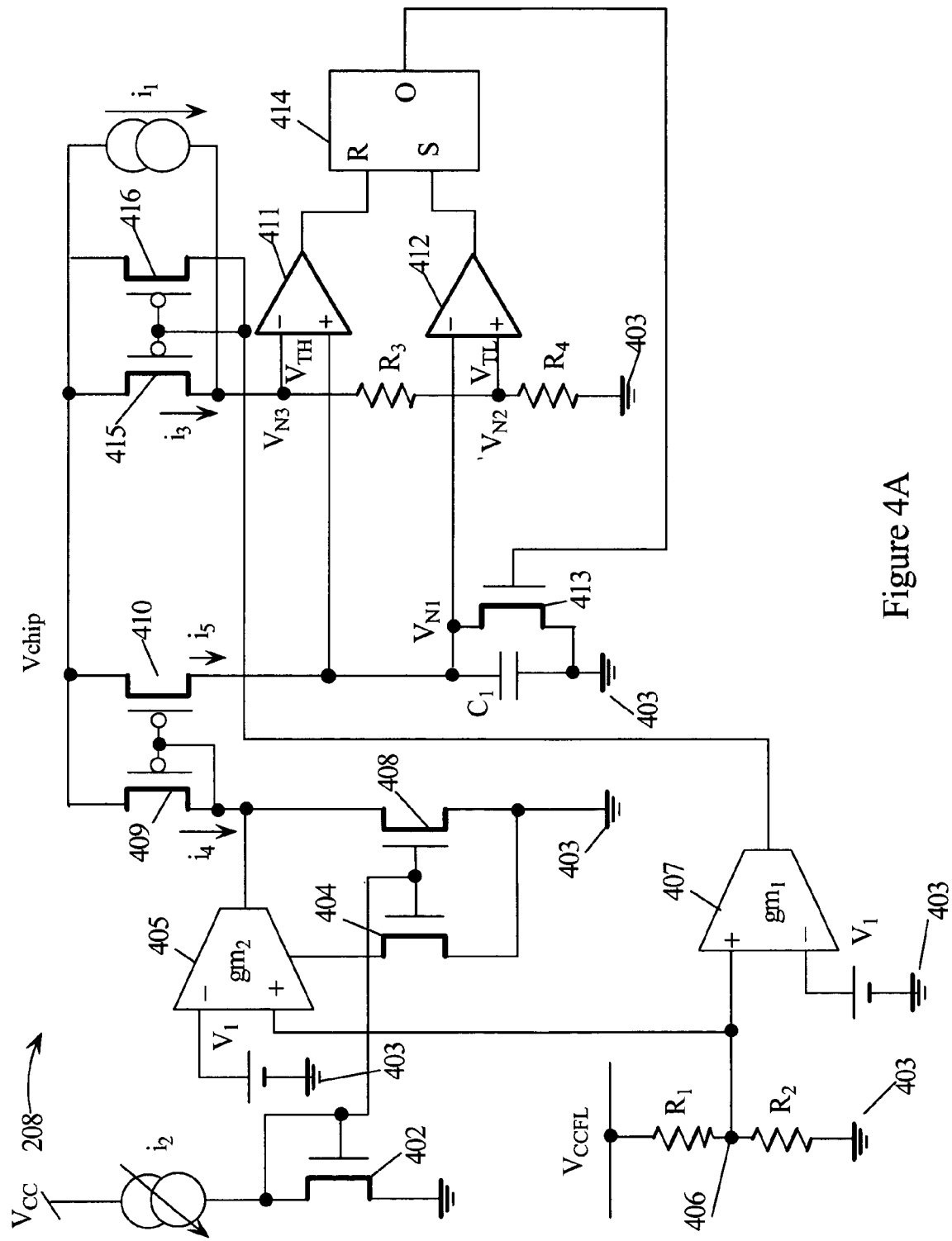
FIG. 4A illustrates an embodiment of the present invention of a saw tooth generator.
Figure 4B:
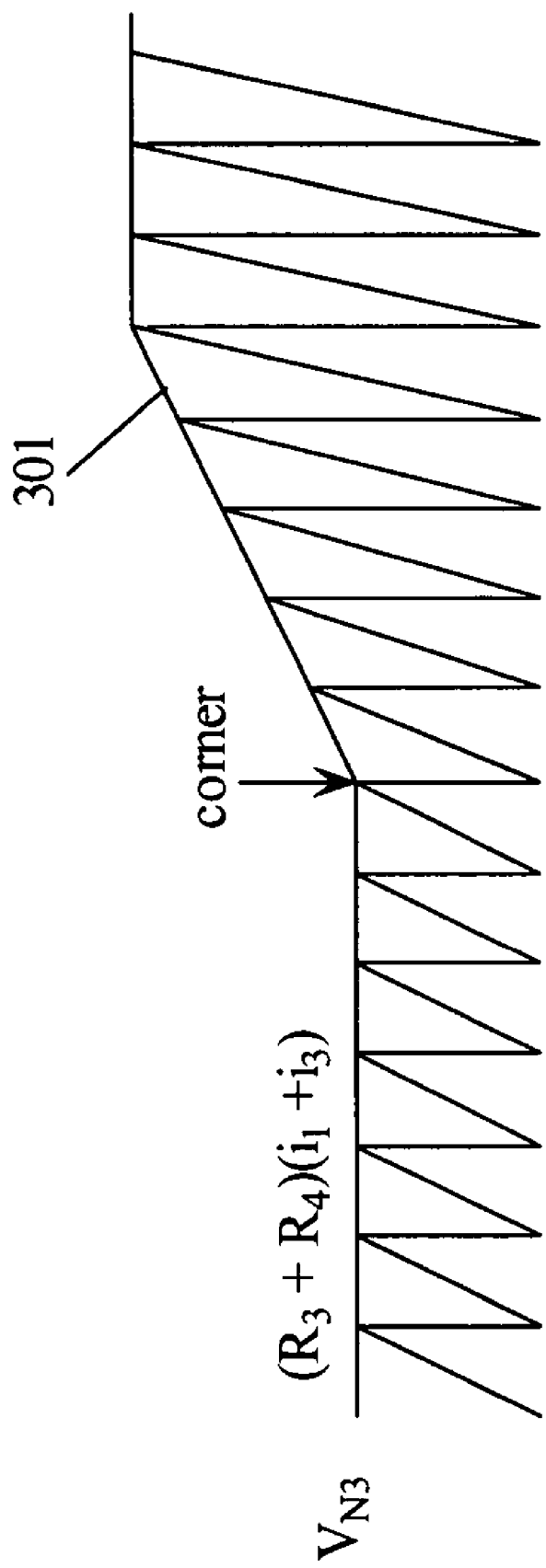
FIG. 4B illustrates an embodiment of the present invention of a saw tooth signal with an amplitude equal to the high voltage threshold.

FIGS. 4A–B—Saw Tooth Generator

FIG. 4A illustrates an embodiment of the present invention of a saw tooth generator 208 (FIG. 2). Referring to FIG. 4A, saw tooth generator 208 includes a power supply voltage, VCC 401, that generates a user selected current, $i_2$, that is inputted to the drain of n-type transistor 402. The source of n-type transistor 402 is coupled to ground 403. The drain and gate of n-type transistor 402 is coupled to the gates of n-type transistors 404, 408. Transistor 404 is configured to bias transconductance amplifier ($gm_2$) 405 which determines the gain of amplifier 405. Transconductance amplifier 405 may be configured to receive a fixed voltage, $V_1$, coupled to ground 403 as well as the voltage at node 406 which is a function of CCFL voltage 102 (identified as $V_{CCFL}$). Amplifier 405 may be configured to generate a current that is a function of the difference in voltages between $V_1$ and the voltage at node 406.

$V_{CCFL}$ may be coupled to a resistor R1 which is coupled to a resistor R2 which is coupled to ground 403. The voltage at node 406 (node between resistor R1 and resistor R2) is inputted to transconductance amplifier ($gm_1$) 407. Amplifier 407 may further be configured to receive fixed voltage, $V_1$, coupled to ground 403. Amplifier 407 may be configured to generate a current that is a function of the difference in voltages between $V_1$ and the voltage at node 406.

The output of amplifier 405 is coupled to the drain of n-type transistor 408. The gate of transistor 408 is coupled to the gate of transistor 404 and to the gate and drain of transistor 402. The source of transistor 408 is coupled to the source of transistor 404 which are both coupled to ground 403.

The drain of transistor 408 is coupled to the drain of p-type transistor 409 and to the gates of p-type transistors 409, 410. The sources of transistors 409, 410 are coupled to the supply voltage of controller 112 (FIG. 1).

Saw tooth generator 208 may further include a fixed current source with a current indicated as $i_1$. Saw tooth generator 208 may further include p-type transistors 415, 416 whose sources are coupled to the supply voltage of controller 112 (FIG. 1). The gates of transistors 415, 416 are tied together. Further, the gate of transistor 415 is coupled to the drain of transistor 416. Further, the drain of transistor 415 is coupled to the fixed current source with the current $i_1$. Further, the drain of transistor 416 is coupled to the output of amplifier 407.

The drain of transistor 410 is coupled to the positive input terminal of a comparator 411 and to the negative input terminal of a comparator 412. Node $V_{N1}$, which is coupled to the negative terminal of comparator 412 and to the positive terminal of comparator 411, corresponds to saw tooth generator signal 301 (bottom portion of FIG. 3). Node $V_{N1}$ is coupled to a capacitor, indicated as $C_1$. Capacitor $C_1$ is coupled to ground 403. One terminal of capacitor $C_1$ is coupled to the drain of n-type transistor 413 and the other terminal of capacitor $C_1$ is coupled to the source of n-type transistor 413.

As stated above, the positive terminal of comparator 411 receives the voltage at $V_{N1}$. The negative terminal of comparator 411 may be referred to as the "high voltage threshold $V_{TH}$" which corresponds to the voltage at node $V_{N3}$. The voltage at node $V_{N3}$ (peak voltage of saw tooth signal 301) is equal to the equation:

$$V_{N3} = (R3+R4)*(i_1+i_3) \tag{EQ1}$$

where resistor R3 is the resistor coupled between node $V_{N3}$ and the node designated as $V_{N2}$; where resistor R4 is the resistor coupled between node $V_{N2}$ and ground 403; and where $i_3$ is the current flowing through the drain of transistor 415. As a result, the voltage at node $V_{N3}$ is a function of the voltage of $V_{CCFL}$ as discussed further below.

When the voltage of $V_{CCFL}$ is at a low voltage level, such as 6 volts, the current indicated as $i_3$, is approximately zero. When $V_{CCFL}$ switches to a high voltage level, such as 22 volts, the current indicated as $i_3$ transitionally increases to a stable level thereby transitionally increasing the voltage level at node $V_{N3}$ to a stable level as indicated in FIG. 4B. Referring to FIG. 4B, the point indicated as "corner" refers to the time that the voltage of $V_{CCFL}$ switches from a low voltage level to a high voltage level. Further, as illustrated in FIG. 4B, the amplitude of saw tooth signal 301 corresponds to the voltage at node $V_{N3}$ and consequently is a function of the voltage of $V_{CCFL}$ as described in further detail below.

Returning to FIG. 4A, as stated above, the negative terminal of comparator 412 receives the voltage at node $V_{N1}$. The positive terminal of comparator 412 may be referred to as the "low voltage threshold $V_{TL}$" which corresponds to the voltage at node $V_{N2}$. A more detail explanation of comparator 412 comparing the voltage level at node $V_{N1}$ with the voltage level at node $V_{N2}$ is provided further below.

Saw tooth generator 208 may further include a flip-flop 414 whose "reset" input is coupled to the output of comparator 411 and whose "set" input is coupled to the output of comparator 412. The output of flip-flip 414 is coupled to the gate of transistor 413.

When the voltage level at node $V_{N1}$ is greater than the voltage level at node $V_{N3}$, comparator 411 outputs an activated signal, e.g., binary value of 1, to the reset input terminal of flip-flop 414 thereby causing flip-flop 414 to reset or output an activated signal, e.g., binary value of 1, which activates transistor 413. Upon activating transistor 413, capacitor $C_1$ discharges thereby causing the voltage level at node $V_{N1}$ to decrease sharply.

When the voltage level at node $V_{N1}$ is less than the voltage level at node $V_{N2}$, comparator 412 outputs an activated signal, e.g., binary value of 1, to the set input terminal of flip-flop 414 thereby causing flip-flop 414 to set or output a deactivated signal, e.g., value of 0, which deactivates transistor 413. Upon deactivating transistor 413, capacitor $C_1$ charges thereby causing the voltage level at node $V_{N1}$ to increase in a linear fashion.

As a result of charging and discharging capacitor $C_1$ based on whether the voltage level at node $V_{N1}$ is greater than the voltage level at node $V_{N3}$ and whether the voltage level at node $V_{N1}$ is less than the voltage level at node $V_{N2}$, a resulting saw tooth signal 301 as illustrated in the bottom portion of FIG. 3 is produced.

The amplitude of the resulting saw tooth signal 301 will increase as indicated in the bottom portion of FIG. 3 when the input voltage level (voltage level of $V_{CCFL}$) changes from a low voltage level to a high voltage level. Further, the current, indicated as $i_3$, increases in amperage when the voltage level of $V_{CCFL}$ changes from a low voltage level to a high voltage level as described below.

The current, indicated as $i_3$, may have a value approximately zero when the voltage level of $V_{CCFL}$ is at a low voltage level, e.g., 6 volts, since the current generated by amplifiers 405, 407 is approximately zero. When the voltage level of $V_{CCFL}$ is at a low voltage level, the voltage at node 406, which corresponds to ($V_{CCFL}*R2/(R1+R2)$) will be approximately equal to the fixed voltage $V_1$. Hence, the current generated by amplifiers 405, 407 is a function of the voltages $V_1$ and $V_{CCFL}$. The current flowing through the drain of transistor 408 is a function of $i_2$ and hence the current flowing through the drain of transistor 409 (labeled as $i_4$) is a function of $i_2$ as well as $V_1$ and $V_{CCFL}$. Since transistors 409, 410 form a current mirror, the current flowing through the drain of transistor 409 flows through the drain of transistor 410 (labeled as $i_5$). Hence, the voltage at node $V_{N1}$ is a function of $i_2$ as well as $V_1$ and $V_{CCFL}$. Consequently, when the voltage level of $V_{CCFL}$ is at a low voltage, the voltage at node $V_{N1}$ is primarily a function of $i_2$ as the current generated by amplifiers 405, 407 is approximately zero ($V_1$ is approximately equal to ($V_{CCFL}*R2/(R1+R2)$)).

The current flowing through the drain of transistor 416 is a function of the voltages $V_1$ and $V_{CCFL}$ as the output of amplifier 407 is coupled to the drain of transistor 416. The current flowing through the drain of transistor 415 (labeled as $i_3$) is also a function of the voltages $V_1$ and $V_{CCFL}$ since transistors 415, 416 form a current mirror. Further, as stated above, the current source generating the current $i_1$ is coupled to the drain of transistor 415. Hence, the current flowing to node $V_{N3}$ ($i_3+i_1$) is a function of the current $i_1$ as well as the voltages $V_1$ and $V_{CCFL}$.

Consequently, the voltage at node $V_{N3}$ is a function of current $i_1$ as well as the voltages $V_1$ and $V_{CCFL}$. Consequently, when the voltage level of $V_{CCFL}$ is at a low voltage, the voltage at node $V_{N3}$ is primarily a function of $i_1$ as the current generated by amplifiers 405, 407 is approximately zero ($V_1$ is approximately equal to ($V_{CCFL}*R2/(R1+R2)$)).

When the voltage level of $V_{CCFL}$ is at a high voltage, amplifiers 405, 407 generate a current that is of a nonzero value. This current is added to the current flowing through the drain of transistor 409 (labeled as $i_4$) and consequently added to the current flowing through nodes $V_{N1}$ and $V_{N3}$ (via currents labeled as $i_5$ and $i_3$). Hence, the voltage at node $V_{N3}$ increases in response to the increase in voltage of $V_{CCFL}$.

While the peak voltage $V_{N3}$ (upper threshold limit) is a function of $V_{CCFL}$ and changes in proportion to the changes in the voltage of $V_{CCFL}$, the frequency of saw tooth signal 301 remains constant as illustrated below.

As stated above, the saw tooth peak voltage is equivalent to the voltage $V_{N3}$. While the voltage level of $V_{CCFL}$ is low (prior to the corner), the fixed voltage $V_1 > V_{CCFL}*(R2/(R1+R2))$. When the voltage level of $V_{CCFL}$ is high (after the corner), the fixed voltage $V_1 <= V_{CCFL}*(R2/(R1+R2))$.

The saw tooth frequency is equal to $2*\pi*f$ which is equal to $1/(t)$ where t is the period. The period (as indicated by $t_1$) of saw tooth signal 301 when the voltage level of $V_{CCFL}$ is low, where its amplitude is a function of $V_{N3}$ as described above, is equal to:

$$t_1 = C_1*V_{N3}/i_2 \quad (EQ2)$$

since prior to the corner, the current flowing through $C_1$ is approximately equal to $i_2$.

Further, prior to the corner, $V_{N3}$ may be expressed as follows:

$$V_{N3} = i_1*(R3+R4) \quad (EQ3)$$

since current $i_3$ is approximately zero prior to the corner.

Substituting EQ3 into EQ2, the period $t_1$ may be expressed as follows:

$$t_1 = (i_1/i_2)*(C_1*(R3+R4)) \quad (EQ4)$$

When the voltage level of $V_{CCFL}$ is high (after the corner), the fixed voltage $V_1 <= V_{CCFL}*(R2/(R1+R2))$. Further, the period (as indicated by $t_2$) of saw tooth signal 301 when the voltage level of $V_{CCFL}$ is high, where its amplitude is a function of $V_{N3}$ as described above, is equal to:

$$t_2 = C_1*V_{N3}/(i_2+i_4) \quad (EQ5)$$

Further, after the corner, $V_{N3}$ may be expressed as follows:

$$V_{N3} = (i_1+i_3)*(R3+R4) \quad (EQ6)$$

Substituting EQ6 into EQ5, the period $t_2$ may be expressed as follows:

$$t_2 = ((i_1+i_3)/(i_2+i_4))*(C_1*(R3+R4)) \quad (EQ7)$$

The current, $i_3$, may be expressed as follows:

$$i_3 = \Delta V_{IN\_GM1}*gm_1 \quad (EQ8)$$

where $\Delta V_{IN\_GM1}$ refers to the change in the input voltage to amplifier 407 and $gm_1$ refers to the transconductance of amplifier 407.

Similarly, the current, $i_4$, may be expressed as follows:

$$i_4 = \Delta V_{IN\_GM2}*gm_2 \quad (EQ9)$$

where $\Delta V_{IN\_GM2}$ refers to the change in the input voltage to amplifier 405 and $gm_2$ refers to the transconductance of amplifier 405.

Substituting EQ9 and EQ8 into EQ7, the period $t_2$ may be expressed as follows:

$$t_2 = ((i_1 + \Delta V_{IN\_GM1} * gm_1)/(i_2 + \Delta V_{IN\_GM2} * gm_2)) * (C_1 * (R3+R4)) \quad \text{(EQ10)}$$

$\Delta V_{IN\_GM1}$ is the same as $\Delta V_{IN\_GM2}$ (both are expressed as $\Delta V_{IN}$ hereinafter) since the input voltages to amplifiers 405, 407 are the same. $\Delta V_{IN\_GM1}$ and $\Delta V_{IN\_GM2}$ may be expressed as follows:

$$\Delta V_{IN} = V_1 - (R2/(R1+R2)) * V_{CCFL} \quad \text{(EQ11)}$$

where $(R2/(R1+R2)) * V_{CCFL}$ corresponds to the voltage at node 406.

Further, in order to show that the frequency (f=1/t) of saw tooth signal 301 generated by saw tooth generator 208 of FIG. 4A is constant, the following restriction (EQ12) is placed on saw tooth generator 208 of FIG. 4A. $\Delta V_{IN} * gm_1$ may be expressed as follows:

$$\Delta V_{IN} * gm_1 = k_1 * i_1 \quad \text{(EQ12)}$$

where $k_1$ is a variable. The current generated by amplifier 407 corresponds to $\Delta V_{IN} * gm_1$ which may be defined as a variable multiplied by current source $i_1$.

Further, in order to show that the frequency (f=1/t) of saw tooth signal 301 generated by saw tooth generator 208 of FIG. 4A is constant, the following restriction (EQ13) is placed on saw tooth generator 208 of FIG. 4A. $\Delta V_{IN} * gm_2$ may be expressed as follows:

$$\Delta V_{IN} * gm_2 = k_2 * i_2 \quad \text{(EQ13)}$$

where $k_2$ is a variable. The current generated by amplifier 405 corresponds to $\Delta V_{IN} * gm_2$ which may be defined as a variable multiplied by current source $i_2$.

Substituting EQ13, EQ12 and EQ11 into EQ10, the period $t_2$ may be expressed as follows:

$$t_2 = (i_1 * (1+k_1))/(i_2 * (1+k_2)) * (C_1 * (R3+R4)) \quad \text{(EQ14)}$$

In order to show that the frequency (f=1/t) of saw tooth signal 301 generated by saw tooth generator 208 of FIG. 4A is constant, the following restriction (EQ15) is placed on saw tooth generator 208 of FIG. 4A.

$$k_1 = a * k_2 \quad \text{(EQ15)}$$

where the term "a" corresponds to a constant. EQ15 corresponds to the restriction of the slope of current $i_4$ equaling the slope of current $i_3$.

Substituting EQ15 into EQ14, the time period $t_2$ may be expressed as follows:

$$t_2 = (i_1/i_2) * (C_1 * (R3+R4))$$

The change in the time period ($\Delta t$) is equal to $t_2$ (EQ15)$-t_1$ (EQ4) which is equal to 0.

Therefore, frequency (f=1/t) of saw tooth signal 301 generated by saw tooth generator 208 of FIG. 4A is constant.

Another embodiment of saw tooth generator 208 is provided below in associated with FIG. 5.

Figure 5:
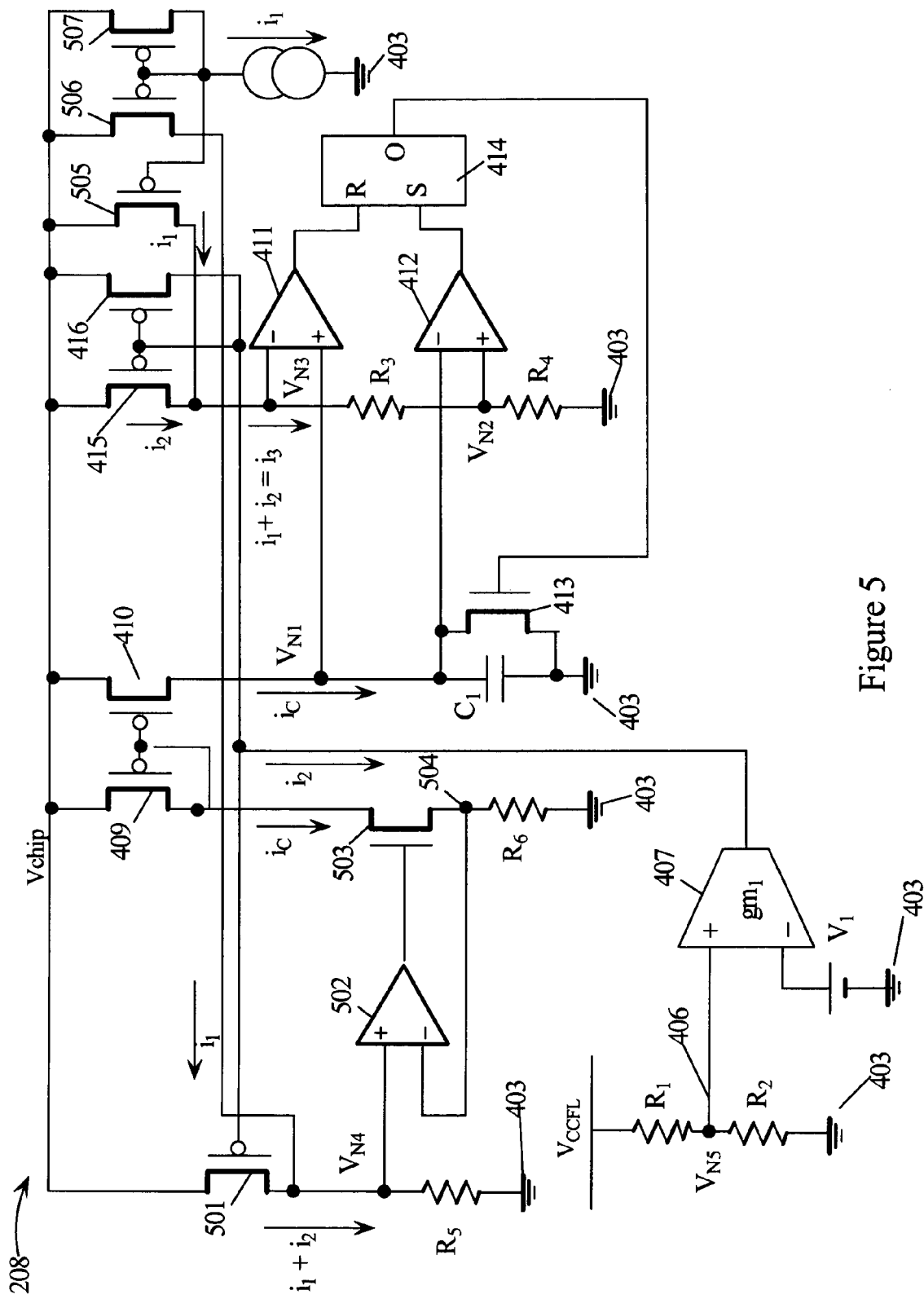
FIG. 5 illustrates another embodiment of the present invention of a saw tooth generator.

FIG. 5—Another Embodiment of Saw Tooth Generator

FIG. 5 is another embodiment of the present invention of saw tooth generator 208 (FIG. 2). Saw tooth generator 208 of FIG. 5 functions similarly as saw tooth generator 208 of FIG. 4A and consequently the functionality will not be described in detail for the sake of brevity. Further, saw tooth generator 208 of FIG. 5 contains many similar elements as saw tooth generator 208 of FIG. 4A. These elements contain the same reference numerals for ease of understanding. The differences between saw tooth generator 208 of FIG. 5 and saw tooth generator 208 of FIG. 4A is the elimination of current source $i_2$, transistor 402, amplifier 405, transistors 404, 408 in saw tooth generator 208 of FIG. 4A and replaced with the following logic as described below.

Saw tooth generator 208 of FIG. 5 includes a p-type transistor 501 coupled to the supply voltage of controller 112 (FIG. 1). The gate of transistor 501 is coupled to the drain of transistor 416 and the drain of transistor 501 is coupled to resistor R5 and to the positive terminal of a comparator 502. The negative terminal of comparator 502 is coupled to resistor R6 and to the source of an n-type transistor 503. The output of comparator 502 is coupled to the gate of transistor 503. The drain of transistor 503 is coupled to the drain of transistor 409.

Saw tooth generator 208 of FIG. 5 further includes p-type transistors 505, 506 and 507. The sources of transistors 505, 506 and 507 are coupled to the supply voltage of controller 112 (FIG. 1). The gates of transistors 506, 507 are coupled together. The gate of transistor 505 is coupled to the gates of transistors 506, 507 and to the drain of transistor 507. The drain of transistor 505 is coupled to the drain of transistor 415. The drain of transistor 507 is coupled to fixed current source $i_1$ which is coupled to ground 403. Since transistors 506, 507 form a current mirror, the current flowing through the drain of transistor 506 flows through the drain of transistor 507 (labeled as $i_1$). Further, the current flowing through the drain of transistor 505 is $i_1$. The drain of transistor 506 is coupled to the node labeled as $V_{N4}$.

The voltage $V_{N3}$ is a function of the voltage of $V_{CCFL}$ by having current $i_3$ being equal to the currents $i_1+i_2$. Current $i_1$ is a fixed constant source and current $i_2$ is the current flowing through the drain of transistor 415. These currents add up together to flow through node $V_{N3}$. Current $i_2$ is a function of the voltage of $V_{CCFL}$ since the output of amplifier 407 is coupled to the drain of transistor 416 and transistors 415, 416 form a current mirror.

The current, indicated as $i_2$, may have a value approximately zero when the voltage level of $V_{CCFL}$ is at a low voltage level, e.g., 6 volts, since the current generated by amplifier 407 is approximately zero. When the voltage level of $V_{CCFL}$ is at a low voltage level, the voltage at node 406, which corresponds to $(V_{CCFL} * R2/(R1+R2))$ will be approximately equal to the fixed voltage $V_1$. Hence, the current generated by amplifier 407 is a function of the voltages $V_1$ and $V_{CCFL}$.

When the voltage level of $V_{CCFL}$ is at a high voltage level, the voltage $V_{CCFL}$ is greater than the voltage at node 406 and hence generates a current, $i_2$. As stated above, this current is added to current $i_1$ which flows through node $V_{N3}$. In this manner, the voltage at node $V_{N3}$ is a function of the voltage $V_{CCFL}$.

The current flowing through the drain of transistor 409 is identified as $i_C$ which flows through node $V_{N1}$ as well as through the drain of transistor 503. The current flowing through transistor 501 is equal to the sum of $i_1+i_2$. The voltage at node $V_{N4}$ is equal to $(i_1+i_2)*R5$ which, as stated above, is inputted to the positive terminal of comparator 502. Comparator 502 compares the voltage at node $V_{N4}$ with the voltage at node 504. If the voltage at node $V_{N4}$ is greater than the voltage at node 504, then comparator 502 outputs a high value, e.g., binary value of 1, which asserts transistor 503 causing transistor 503 to be activated. The voltage at node 504 will rise as the current, $i_C$, flows through resistor R6. If, on the other hand, $V_{N4}$ is less than the voltage at node 504, then comparator 502 outputs a low value, e.g., value of 0, which deasserts transistor 503 causing transistor 503 to be deactivated. The voltage at node 504 will decrease as no current flows through resistor R6. When transistor 503 is activated, the current, $i_C$, flows through transistor 503. When transistor 503 is deactivated, the current, $i_C$, flows through capacitor $C_1$ thereby increasing the voltage of $V_{N1}$ in a saw tooth (linear) manner as illustrated in the bottom portion of FIG. 3.

As with saw tooth generator 208 of FIG. 4A, the frequency of saw tooth generator 208 of FIG. 5 remains constant as illustrated below.

As stated above, the saw tooth peak voltage is equivalent to the voltage $V_{N3}$. While the voltage level of $V_{CCFL}$ is low (prior to the corner), the fixed voltage $V_1 > V_{CCFL}*(R2/(R1+R2))$. When the voltage level of $V_{CCFL}$ is high (after the corner), the fixed voltage $V_1 <= V_{CCFL}*(R2/(R1+R2))$.

The saw tooth frequency is equal to $2*\pi*f$ which is equal to $1/(t)$ where t is the period. The period of saw tooth signal 301 when the voltage level of $V_{CCFL}$ is low ($t_1$), where its amplitude is a function of $V_{N3}$ as described above, is equal to:

$$t_1 = C_1 * V_{N3}/i_C \quad (EQ16)$$

which is equal to:

$$t_1 = (C_1/i_C) * (R3+R4) * i_1 \quad (EQ17)$$

by substituting $V_{N3} = (R3+R4)*i_1$ since $i_2$ is approximately zero. EQ17 is equal to the following by rearranging the terms:

$$t_1 = C_1/(R3+R4))*(i_1/i_C) \quad (EQ18)$$

$$i_C = (R5/R6)*(i_1) \quad (EQ19)$$

because $i_2$ is approximately zero.

Substituting EQ19 into EQ18, the time period $t_1$ equals the following:

$$t_1 = ((C_1*R6)/(R5*(R3+R4))*(i_1/i_1) \quad (EQ20)$$

which is equal to the following by rearranging the terms:

$$t_1 = ((C_1*R6)/(R5*(R3+R4)) \quad (EQ21)$$

As stated above, when the voltage level of $V_{CCFL}$ is high (after the corner), the fixed voltage $V_1 <= V_{CCFL}*(R2/(R1+R2))$. Further, the period of saw tooth signal 301 when the voltage level of $V_{CCFL}$ is high ($t_2$), where its amplitude is a function of $V_{N3}$ as described above, is equal to:

$$t_2 = (C_1/(R3+R4))*(i_1+i_2)/i_C \quad (EQ22)$$

$$i_C = R5/R6*(i_1+i_2) \quad (EQ23)$$

By substituting EQ23 into EQ22, the time period $t_2$ equals the following:

$$t_2 = (C_1/(R3+R4))*(i_1+i_2)/((R5/R6)*(i_1+i_2)) \quad (EQ24)$$

which is reduced to the following by canceling and rearranging the terms:

$$t_2 = (C_1*R6)/(R5*(R3+R4)) \quad (EQ25)$$

The change in the time period ($\Delta t$) is equal to $t_2$ (EQ25)-$t_1$ (EQ21) which is equal to 0.

Therefore, frequency (f=1/t) of saw tooth signal 301 generated by saw tooth generator 208 of FIG. 5 is constant.

Figure 6:
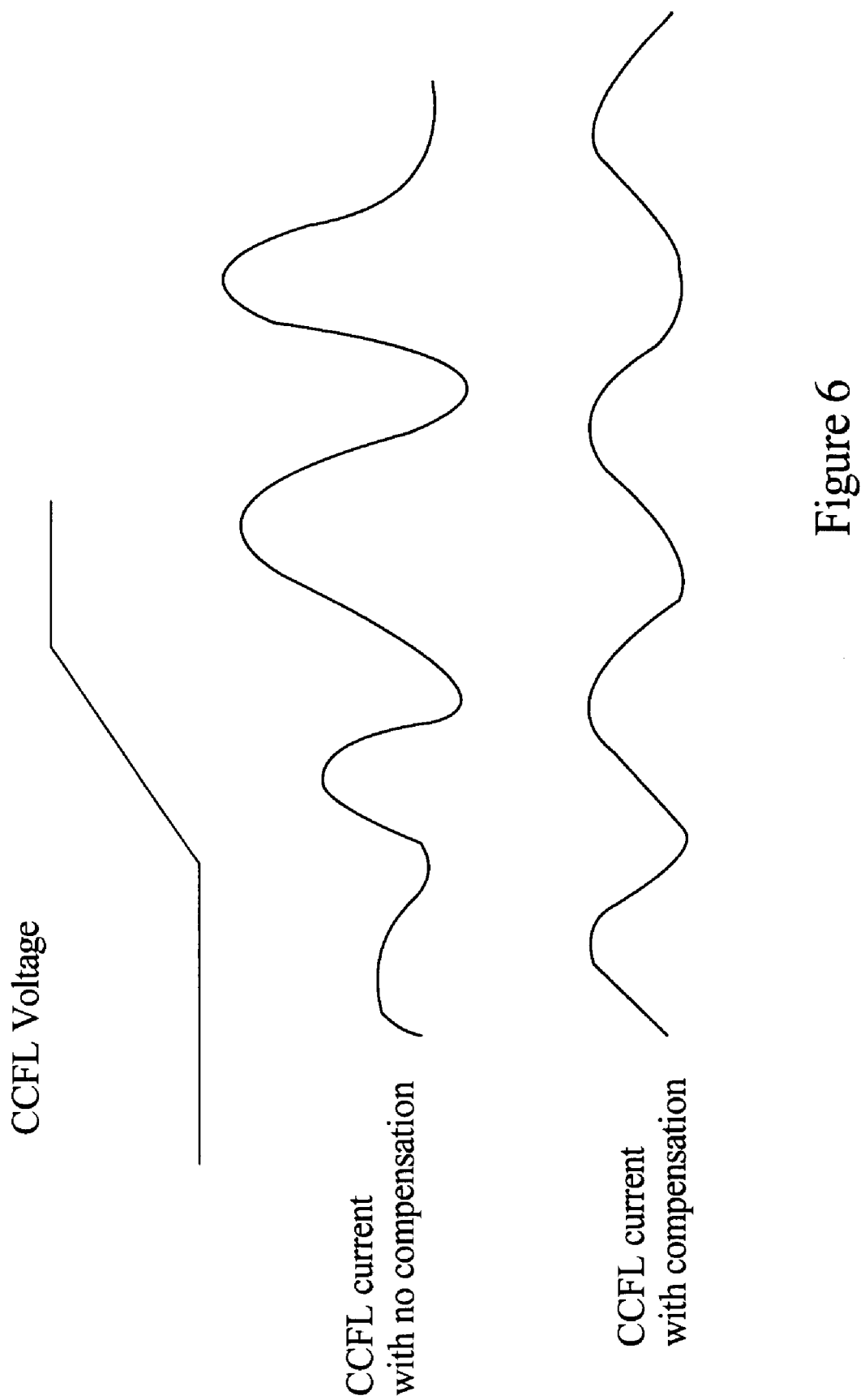
FIG. 6 illustrates the current flowing through the CCFL for the case of not implementing a saw tooth generator of the present invention and for the case of implementing a saw tooth generator of the present invention.

As a result of using compensation circuit 200 (FIG. 2) which includes the embodiments of saw tooth generator 208 (FIGS. 4 and 5), CCFL 101 (FIG. 1) will be protected against a large transient current as illustrated in FIG. 6.

FIG. 6—Illustration of CCFL Current with and without Compensation

FIG. 6 illustrates the current flowing through CCFL 101 (FIG. 1) implementing and not implementing compensation circuit 200 (FIG. 2) to protect CCFL 101 from large transient currents.

When the voltage of CCFL 101 (CCFL voltage 102 of FIG. 1) transitions from a low voltage, e.g., 6 volts, to a high voltage, e.g., 22 volts, the sinusoidal current flowing through CCFL 101 greatly increases if there is no compensation as illustrated in the middle portion of FIG. 6.

However, when the voltage of CCFL 101 (CCFL voltage 102 of FIG. 1) transitions from a low voltage, e.g., 6 volts, to a high voltage, e.g., 22 volts, the sinusoidal current flowing through CCFL 101 remains virtually constant using compensation circuit 200 as described above as illustrated in the bottom portion of FIG. 6. Consequently, by ensuring that the current flowing through CCFL 101 remains virtually constant when the input voltage (CCFL voltage 102) transitions from a low voltage to a high voltage, the lifetime of CCFL 101 is prolonged.

Although the compensation circuit and circuit are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A compensation circuit to protect a lamp from a large transient current comprising:
    a saw tooth generator configured to generate a saw tooth signal with an amplitude corresponding to a supply voltage of the lamp;
    an amplifier configured to generate a Direct Current (DC) baseline signal; and
    a comparator coupled to the saw tooth generator and the amplifier, wherein the comparator outputs a pulse width modulated signal based on the saw tooth signal and the DC baseline signal, wherein a duty cycle of the pulse width modulated signal is a function of the amplitude of the saw tooth signal.

2. The compensation circuit as recited in claim 1, wherein the amplitude of the saw tooth signal increases as a voltage of the supply voltage increases, wherein the duty cycle of the pulse width modulated signal decreases as the amplitude of the saw tooth signal increases.

3. The compensation circuit as recited in claim 2, wherein the duty cycle of the pulse width modulated signal corresponds to a percentage of time the lamp is activated, wherein the lamp is activated a shorter amount of time when the supply voltage increases.

4. The compensation circuit as recited in claim 1 further comprising:
    a full-wave rectifier coupled to a first input of the amplifier; and
    a reference voltage generator coupled to a second input of the amplifier, wherein the reference voltage generator is configured to generate a reference voltage;
    wherein the amplifier generates the DC baseline signal based on a difference of a voltage of an output of the full-wave rectifier and the reference voltage.

5. The compensation circuit as recited in claim 1, wherein the saw tooth generator comprises:
    a first comparator, wherein the first comparator is configured to compare a first voltage with a low voltage threshold;

a second comparator, wherein the second comparator is configured to compare the first voltage with an upper voltage threshold, wherein the upper voltage threshold is a function of the supply voltage; and a flip flop circuit coupled to the first and the second comparators, wherein the flip flop circuit is configured to generate an output based on an output of the first comparator and an output of the second comparator.

6. The compensation circuit as recited in claim 1, wherein the lamp is a cold cathode fluorescent lamp.

7. The compensation circuit as recited in claim 1, wherein the saw tooth signal has a constant frequency.

8. A circuit comprising:

a controller;

a plurality of transistors coupled to the controller, wherein the controller is configured to generate switching signals used to control the switching of the plurality of transistors;

a transformer coupled to the plurality of transistors, wherein a square wave voltage signal is generated across a primary winding of the transformer, wherein a sinusoidal voltage signal is generated across a secondary winding of the transformer;

a lamp coupled to the secondary winding of the transformer; and a compensation circuit coupled to the lamp, wherein the compensation circuit comprises:

a saw tooth generator configured to generate a saw tooth signal with an amplitude corresponding to a supply voltage of the lamp;

an amplifier configured to generate a Direct Current (DC) baseline signal; and a comparator coupled to the saw tooth generator and the amplifier, wherein the comparator outputs a pulse width modulated signal based on the saw tooth signal and the DC baseline signal, wherein a duty cycle of the pulse width modulated signal is a function of the amplitude of the saw tooth signal.

9. The circuit as recited in claim 8, wherein the amplitude of the saw tooth signal increases as a voltage of the supply voltage increases, wherein the duty cycle of the pulse width modulated signal decreases as the amplitude of the saw tooth signal increases.

10. The circuit as recited in claim 9, wherein the duty cycle of the pulse width modulated signal corresponds to a percentage of time the lamp is activated, wherein the lamp is activated a shorter amount of time when the supply voltage increases.

11. The circuit as recited in claim 8, wherein the compensation circuit further comprises:

a full-wave rectifier coupled to a first input of the amplifier; and a reference voltage generator coupled to a second input of the amplifier, wherein the reference voltage generator is configured to generate a reference voltage;

wherein the amplifier generates the DC baseline signal based on a difference of a voltage of an output of the full-wave rectifier and the reference voltage.

12. The circuit as recited in claim 8, wherein the saw tooth generator comprises:

a first comparator, wherein the first comparator is configured to compare a first voltage with a low voltage threshold;

a second comparator, wherein the second comparator is configured to compare the first voltage with an upper voltage threshold, wherein the upper voltage threshold is a function of the supply voltage; and a flip flop circuit coupled to the first and the second comparators, wherein the flip flop circuit is configured to generate an output based on an output of the first comparator and an output of the second comparator.

13. The circuit as recited in claim 8, wherein the lamp is a cold cathode fluorescent lamp.

14. The circuit as recited in claim 8, wherein the saw tooth signal has a constant frequency.

* * * * *